Jan. 22, 1963 N. J. THIELE 3,074,220
GRASS TRIMMER

Filed Feb. 21, 1961 2 Sheets-Sheet 1

INVENTOR.
Norbert J. Thiele
BY Sam J. Slotsky
ATTORNEY

INVENTOR.
Norbert J. Thiele
BY
Sam J. Slotsky
ATTORNEY

United States Patent Office 3,074,220
Patented Jan. 22, 1963

3,074,220
GRASS TRIMMER
Norbert J. Thiele, 1902 S. 4th Ave., Sioux Falls, S. Dak.
Filed Feb. 21, 1961, Ser. No. 90,668
2 Claims. (Cl. 56—25.4)

My invention relates to a grass trimmer.

An object of my invention is to provide a grass trimmer which will trim the grass neatly from surfaces which are normally inaccessible, such surfaces being along sidewalks, gravestones, etc.

A further object of my invention is to provide a grass trimmer which will operate efficiently in that the trimmer will cause the grass etc. which is adjacent to the surfaces to be uniformly directed toward the rotatable cutting units of the device.

A further object of my invention is to provide an arrangement in which the taller grass, or weeds, is carried into pockets whereby the cutting action is more efficient.

A further object of my invention is to provide attenuated wheels which will allow a rolling action to be imparted to the unit, and which wheels will not interfere with the proper grass cutting and directing action.

A further object of my invention is to provide means whereby the unit can be placed directly against any surface adjacent to the grass which is to be cut, and in a unit which is pulled instead of pushed to provide a better operating action.

A further object of my invention is to provide a guard unit which will prevent the central parts of the trimmer from falling into holes and the like, etc.

Figure 1:
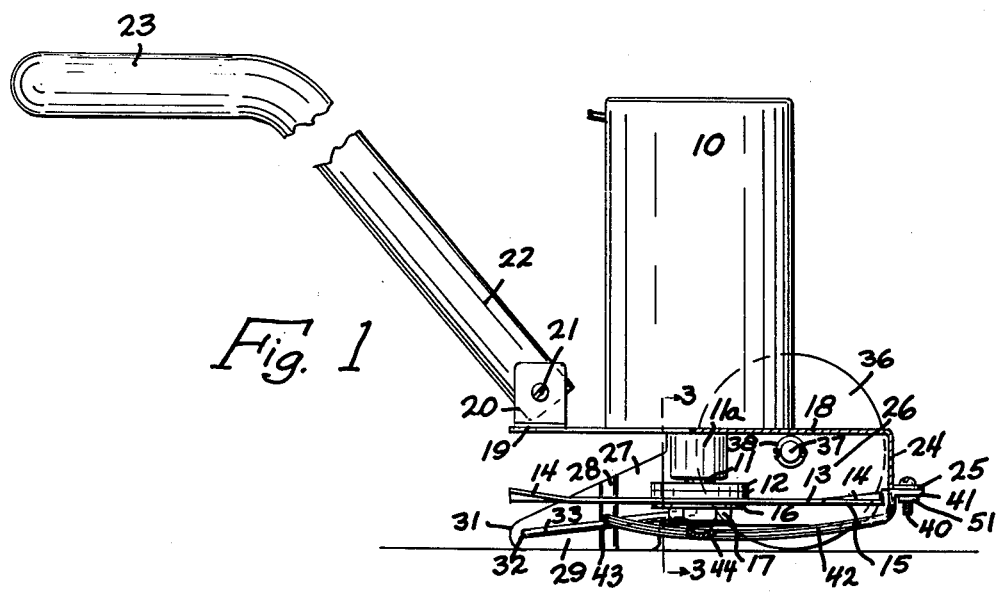
Figure 2:
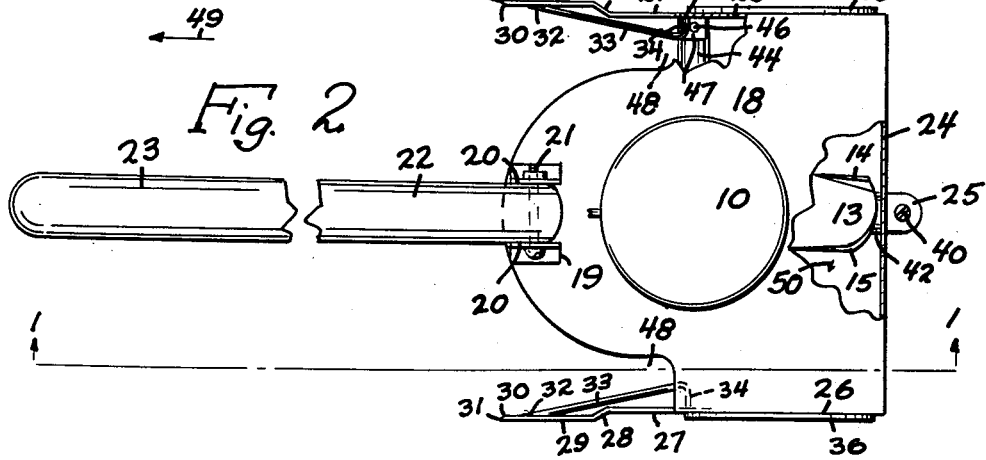
Figure 3:
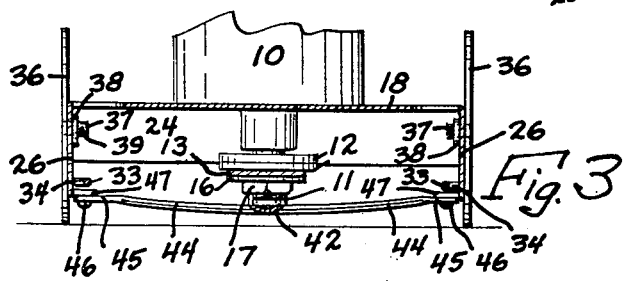
Figure 4:
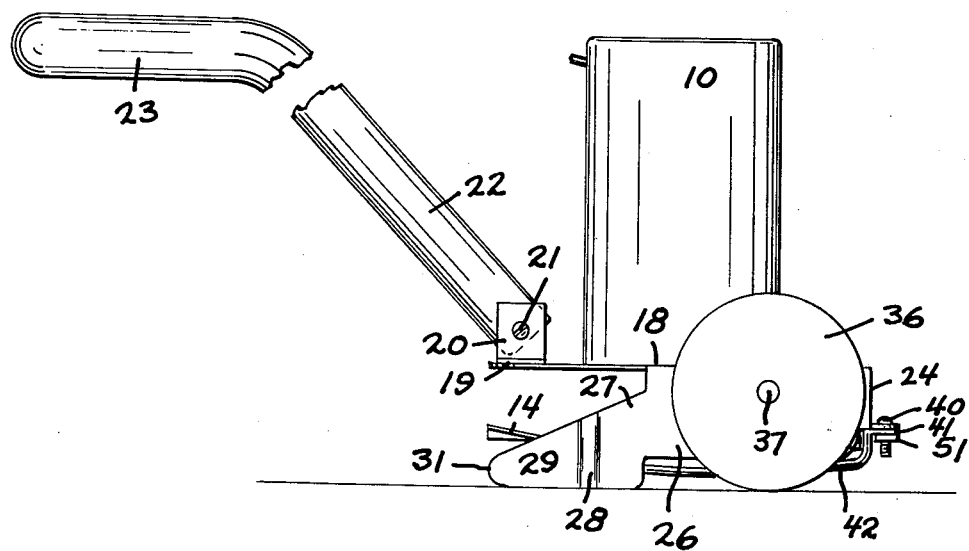

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of my grass trimmer, and taken generally along the lines 1—1 of FIGURE 2, FIGURE 2 is a plan view of FIGURE 1, with fragmentary sections, FIGURE 3 is a sectional view taken generally along the lines 3—3 of FIGURE 1, and FIGURE 4 is a side elevation of the grass trimmer.

My invention contemplates the provision of a grass trimmer which will operate to provide a variety of advantages as above explained, and which is relatively small and efficient.

In describing my invention I have used the character 10 to designate an electric motor, it being understood, however, that other types of motors could be used, this motor including the driven shaft 11 passing through the hub portion 11a, and attached to the shaft 11 are the discs 12. Positioned against one of the discs 12 is a cutting blade 13 having the upwardly extending portions 14 and the cutting edges 15, the character 16 indicating a washer which bears against the under side of the cutting blade, the character 17 indicating a nut threadably engaged with the lower end of the shaft 11. The character 18 indicates a flat base to which the motor is attached, and attached to the base member 18 at 19 are the upwardly projecting ears 20, which ears receive the transverse bolt 21, the bolt 21 also passing through the lower end of the handle 22, which handle 22 includes the handle grasping end portion 23, and which handle 22 can be of any desired length.

Extending downwardly from the base 18 is an integral flange 24 including an ear 25, and also extending vertically downwardly from the base 18 are the side members 26, the members 26 extending into the further portions 27, which portions 27 thence extend slightly outwardly as at 28, and thence extend forwardly in the end portions 29, which portions 29 are suitably sharpened as at 30 along the arcuate ends 31. Attached at 32 to the members 29 are the bars 33 which extend inwardly, and which then extend outwardly in the portions 34, which portions 34 are attached at 35 to the side portions 26.

The character 36 indicates a pair of thin discs to which are attached the short shafts 37, which shafts 37 pass through the bosses 38, which bosses 38 are attached to the side walls 26, the character 39 indicating cotter keys for retaining the discs or wheels 36 from lateral displacement.

It will be noted that the discs or wheels 36 will not extend laterally beyond the portions 29.

Attached to the ear 25 by means of the machine screw 40 is the flattened end 41 of a bar 42 which is substantially arcuate in cross section as shown, which bar is curved and terminates at 43. Attached to the bar 42 are the transverse bar portions 44 (see FIGURE 3) which extend into the flattened portions 45, which portions 45 are secured by means of suitable screws 46 to the ears 47 which ears are secured to the side walls 26, the bar portions 44 also being arcuate in cross section.

The base 18 includes the spaces 48 at either side thereof, the purpose of which will be explained.

The device is operated in the following manner. The trimmer is pulled in the direction of the arrow 49, and the portion 29 is placed against the gravestone, the edge of the side-walk, or any other surface, with the motor 10 being started which provides rotation of the blades in the direction of the arrow 50 (see FIG. 2). The cutting edges 15 will then cut the grass, and the grass which is adjacently positioned to the gravestone edge, etc. is then deflected by the bar 33 inwardly toward the cutting blades, this inward deflection of the grass thereby providing a uniform and smooth cutting action without jamming, since the grass will be carried inwardly.

Since the wheels or discs 36 will not extend beyond the portions 29, the effect will be to provide a smooth cutting action up to the confines of the side-walk, etc.

Also, the spaces 48 provide an important function in that these spaces will prevent jamming of the arrangement when cutting longer grass or weeds, since these longer portions will be carried into these spaces where they can be efficiently attacked by the cutting blades, so that as a result a smooth and uniform cutting action is provided, which cutting action will be at a maximum distance laterally. The arcuate portions 31 will carry bent-over grass and the like upwardly to a vertical position so that these portions can then be deflected inwardly as explained above.

It will be noted that the trimmer can operate at either side, thereby accommodating various conditions wherein one side can be operated on, or the other side, since the members 29 etc. are provided at either side. The unit can also be used for ordinary grass cutting operations.

The bars 42 and 44 provide an important function in that they will prevent the blades from falling into low pockets in the ground, and will also protect the nut and washer assembly 17, 16. The bars 42, 44 can be easily removed for blade replacement and the like by merely first removing the screws 46, and thence by loosening the nut 51, which is engaged with the screw 40, sufficiently so that the bars 42, 44 can be moved outwardly with respect to the nut 17 and thence swung over to one side, and after the operation is completed, the arrangement can be re-tightened again.

As a result, it will be noted that my device will provide a smooth and efficient cutting action as explained, it also being noted that the device will include the advantages above enumerated in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A grass trimmer comprising a vertically positioned motor including a driven shaft, a rotary blade attached to said shaft, a platform upon which said motor is mounted, vertically positioned side walls attached to said platform, said vertically positioned side walls including forwardly extending portions, said portions tapering forwardly, bars attached at the terminals of said forwardly extending portions, said bars converging toward the central axis of said motor to thereby deflect grass into the cutting path of said blade, said forwardly extending portions having arcuate ends, said forwardly extending portions being spaced slightly beyond said side walls, discs journalled on said side walls, said discs being thin enough to be positioned within the laeral confines of said forwardly extending portions.

2. A grass trimmer comprising a vertically positioned motor including a driven shaft, a rotary blade attached to said shaft, a platform upon which said motor is mounted, vertically positioned side walls attached to said platform, said vertically positioned side walls including forwardly extending portions, said portions tapering forwardly, bars attached at the terminals of said forwardly extending portions, said bars converging toward the central axis of said motor to thereby deflect grass into the cutting path of said blade, said forwardly extending portions having arcuate ends, said forwardly extending portions being spaced slightly beyond said side walls, discs journalled on said side walls, said discs being thin enough to be positioned within the lateral confines of said forwardly extending portions, said platform having openings between said platform and said side walls to receive longer growths whereby said longer growths can be cut by said blade.

References Cited in the file of this patent

UNITED STATES PATENTS

| | | |
|---|---|---|
| 2,514,278 | Dunn et al. | July 4, 1950 |
| 2,708,335 | Newton | May 17, 1955 |
| 2,724,229 | Graham | Nov. 22, 1955 |
| 2,795,095 | Kaufman | June 11, 1957 |
| 2,796,715 | Meltzer | June 25, 1957 |